(12) United States Patent
Jankovic (10) Patent No.: US 7,448,359 B2
(45) Date of Patent: *Nov. 11, 2008

(54) MULTI-MODE INTERNAL COMBUSTION ENGINE

(75) Inventor: Mrdjan Jankovic, Birmingham, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 146 days.

This patent is subject to a terminal disclaimer.

(21) Appl. No.: 11/463,872

(22) Filed: Aug. 10, 2006

(65) Prior Publication Data

US 2008/0035125 A1 Feb. 14, 2008

(51) Int. Cl.
*F02B 31/08* (2006.01)

(52) U.S. Cl. ............... 123/432; 123/302; 123/306; 123/90.11; 123/90.15

(58) Field of Classification Search .......... 123/90.11, 123/90.15, 302, 306, 432
See application file for complete search history.

(56) References Cited

U.S. PATENT DOCUMENTS

| | | | |
|---|---|---|---|
| 5,036,668 A | 8/1991 | Hardy | |
| 6,267,097 B1 | 7/2001 | Urushihara et al. | |
| 6,276,334 B1 | 8/2001 | Flynn et al. | |
| 6,293,246 B1 | 9/2001 | Tanahashi et al. | |
| 6,295,973 B1 | 10/2001 | Yang | |
| 6,336,436 B1 | 1/2002 | Miyakubo et al. | |
| 6,390,054 B1 | 5/2002 | Yang | |
| 6,516,774 B2 | 2/2003 | zur Loye et al. | |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,675,579 B1 | 1/2004 | Yang | |
| 6,725,825 B1 | 4/2004 | Kurtz et al. | |
| 6,739,295 B1 | 5/2004 | Yamaoka et al. | |
| 6,923,167 B2 | 8/2005 | Flowers | |
| 6,932,175 B2 | 8/2005 | Teraji et al. | |
| 7,128,062 B2 * | 10/2006 | Kuo et al. | 123/302 |
| 7,213,566 B1 * | 5/2007 | Jankovic | 123/302 |
| 7,213,585 B2 * | 5/2007 | Yang | 123/543 |
| 7,258,104 B2 * | 8/2007 | Young et al. | 123/432 |
| 2004/0065279 A1 | 4/2004 | Hitomi et al. | |
| 2004/0182359 A1 | 9/2004 | Stewart et al. | |
| 2005/0121008 A1 | 6/2005 | Kilkenny et al. | |
| 2005/0173169 A1 | 8/2005 | Gray, Jr. | |
| 2005/0183693 A1 | 8/2005 | Yang et al. | |

OTHER PUBLICATIONS

U.S. Appl. No. 11/233,171, filed Mar. 22, 2007, Yang.

* cited by examiner

*Primary Examiner*—Erick Solis
(74) *Attorney, Agent, or Firm*—Allan J. Lippa; Alleman Hall McCoy Russell & Tuttle, LLP (57) ABSTRACT

A method of operating an engine having at least one cylinder, the method comprising of directing a first air stream to an intake valve of the cylinder; directing a second, separate air stream to a second intake valve of the cylinder, said second air stream at a higher temperature than said first air stream; operating said first intake valve and adjusting at least one of an opening timing and a closing timing of said first intake valve to adjust engine output; and intermittently operating said second intake valve to maintain said higher temperature of said second air stream.

22 Claims, 7 Drawing Sheets

MULTI-MODE INTERNAL COMBUSTION ENGINE

FIELD

The present application relates to controlling intake air supplied to a cylinder of an engine adapted to operate in multiple modes of operation.

BACKGROUND AND SUMMARY

Internal combustion engines may operate in a variety of combustion modes. One example mode is homogeneous charge compression ignition (HCCI) also known as controlled autoignition (CAI), wherein a charge including an air and fuel mixture is compressed until autoignition occurs without necessarily requiring a spark being performed by a sparking device. In some conditions, HCCI may have greater fuel efficiency and reduced NOx production compared to other combustion modes such as spark ignition. However, HCCI may be limited under some conditions, since autoignition may be at least partially limited by the temperature of the charge and/or compression performed within the cylinder. Further, transitions into and out of the HCCI operation may present various control issues.

One approach to enable operation in a variety of combustion modes is described in U.S. 2005/0183693. In this example, a cylinder with cam profile switching is used to selectively provide operation in HCCI and SI modes.

However, the inventors herein have recognized a disadvantage with such an approach. For example, during the transient conditions of SI/HCCI transitions in the above system, the cylinders may receive unsuitable relative intake air amounts between different temperature air streams, such as more air of an increased temperature than needed for some operating conditions. Further, the approach of conditioning intake air, for example, by heat addition may provide degraded temperature control of the charge temperature during combustion mode transitions, which may be caused by operation in a particular mode.

In one approach, the above issues may be addressed by a method of operating an engine having at least one cylinder, the method comprising directing a first air stream to an intake valve of the cylinder; directing a second, separate air stream to a second intake valve of the cylinder, said second air stream at a higher temperature than said first air stream; operating said first intake valve and adjusting at least one of an opening timing and a closing timing of said first intake valve to adjust engine output; and intermittently operating said second intake valve to maintain said higher temperature of said second air stream.

In this way, by utilizing at least one electrically actuated valve to intermittently leak intake air into the cylinder from the heated intake passage, a ready reserve of heated air may be achieved prior to a transition to HCCI operation, while also reducing degradation of engine performance during spark ignition operation.

The inventors have also recognized that some operating modes may utilize differing amounts of the conditioned (e.g. heated or cooled) intake air. As such, energy used to facilitate heating and/or cooling of the intake air may be wasted. Further, the extent to which the intake air is conditioned may also affect the charge temperature control. For example, as the amount of heating provided to the intake air is reduced the charge temperature may vary.

In another approach, the above issues may be addressed by a method of operating an engine having at least one cylinder, at least one intake passage operatively coupled to the cylinder for directing intake air to the cylinder, and a heat exchanger arranged along the intake passage to heat the intake air passing through the intake passage before reaching the cylinder, the method comprising: varying an amount of heat provided to the intake air by the heat exchanger in response to a combustion mode of the cylinder; and supplying heated intake air to the cylinder by intermittently operating an intake valve, wherein said intermittent operation of the intake valve is varied in response to the amount of heat provided to the intake air by the heat exchanger.

In this way, the amount of heating provided to the intake air may be adjusted based on the amount of heated air used during the particular operating mode and the operation of an intake valve controlling the delivery of the heated air to the cylinder may be adjusted to maintain the desired charge temperature.

DETAILED DESCRIPTION

Figure 1:
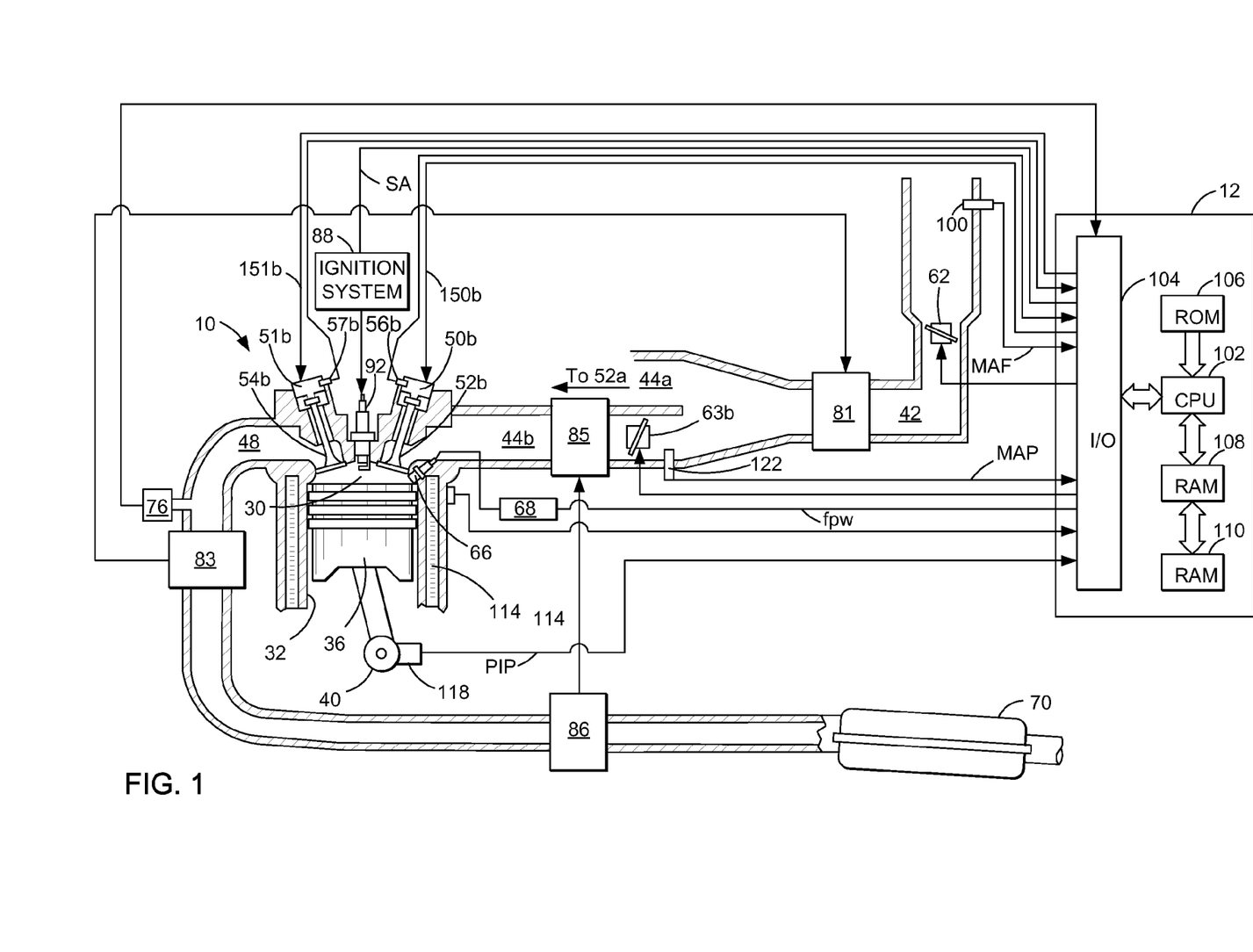
FIG. 1 shows an example engine cylinder configuration.
Figure 2:
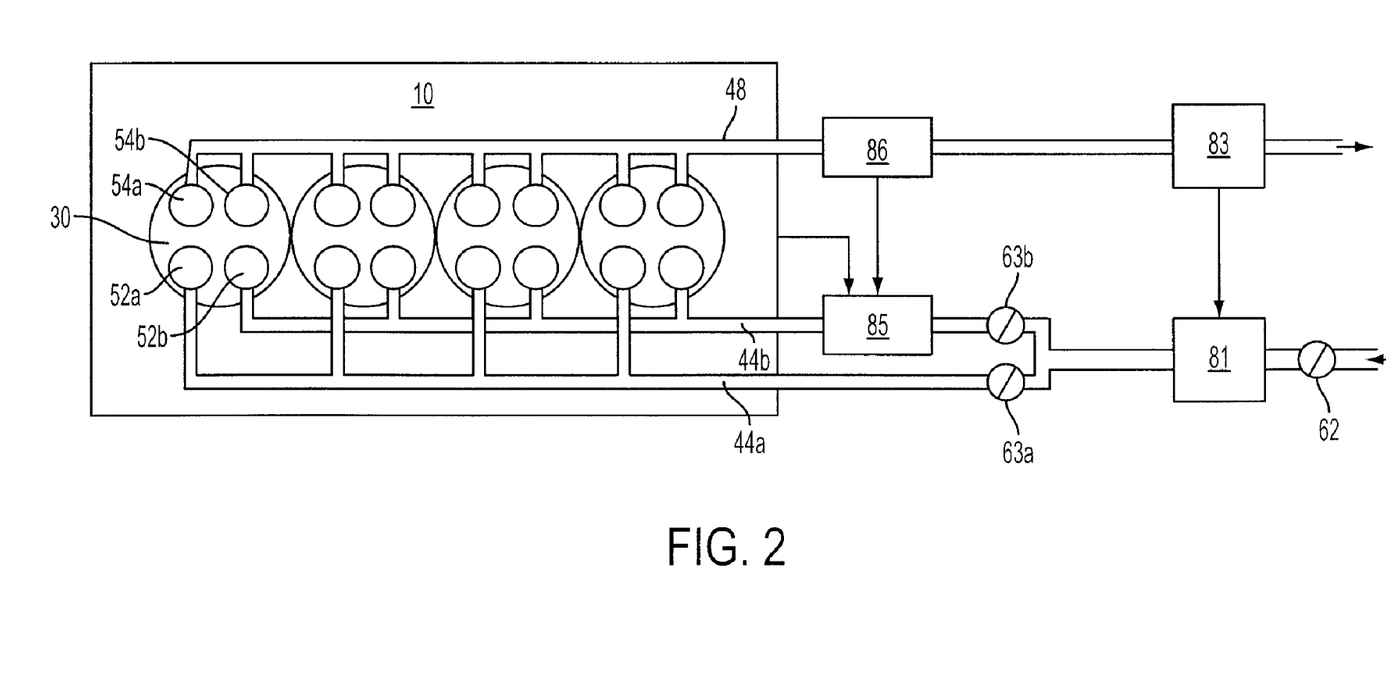
FIG. 2 shows an alternate view the example engine of FIG. 1.

FIG. 1 is a schematic diagram of one cylinder of a multi-cylinder engine, as well as one of the intake and exhaust paths connected to that cylinder. A direct injection internal combustion engine 10, comprising a plurality of combustion chambers, is controlled by a control system including electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown). Combustion chamber 30 is shown communicating with intake manifold 44b and exhaust manifold 48 via respective intake valve 52b and exhaust valve 54b. Combustion chamber 30 also may communicate with intake manifold 44a and exhaust manifold 48 via respective intake valve 52a and exhaust valve 54a as shown in FIG. 2. As will be described herein in greater detail, intake air may be delivered to combustion chamber 30 via valve 52b at a higher temperature than intake air supplied via valve 52a.

Intake valve 52b may be electrically controlled by electric valve actuation (EVA) via electric actuator 50b. The opening and closing of intake valve 52b may be varied by controller 12 via signal 150b. Similarly, exhaust valve 54b may be controlled by EVA via electric actuator 51b, wherein the opening and closing of exhaust valve 54b may be varied by controller 12 via signal 151b. The position of intake valve 52b and exhaust valve 54b may be determined by valve position sensors 56b and 57b, respectively. As will be shown in FIG. 2, cylinder 30 may include a second intake valve 52a and a second exhaust valve 54a each of which may be similar to intake and exhaust valves 52b and 54b, respectively. For example, intake valve 52a and exhaust valve 54a may each include an electric valve actuator, position sensor, and may be communicatively coupled to controller 12. In this manner, operation of the intake and exhaust valves may be controlled by the engine control system enabling the valve timing, valve lift, lift duration, etc. to be varied responsive to various operating conditions and/or operating modes of the engine. While FIG. 1 shows intake and exhaust valves of cylinder 30 controlled via EVA, it should be appreciated that in alternative embodiments, one or more exhaust valves and/or intake valves may be controlled mechanically via cam profile switching (CPS), variable cam timing (VCT), variable valve timing (VVT) and/or variable valve lift (VVL) systems. For example, cylinder 30 may include two intake valves controlled via EVA and two exhaust valves controlled via cam actuation including CPS and/or VCT.

Fuel injector 66 is shown directly coupled to combustion chamber 30 for injecting fuel directly therein in proportion to the pulse width of signal fpw received from controller 12 via electronic driver 68. The fuel injector may be mounted in the side of the combustion chamber or in the top of the combustion chamber, for example. Fuel may be delivered to fuel injector 66 by a conventional high pressure fuel system (not shown) including a fuel tank, fuel pumps, and a fuel rail.

Intake manifold 42 is shown communicating with main throttle 62. In this particular example, the position of throttle 62 may be varied by controller 12 via an electric motor, a configuration that is commonly referred to as electronic throttle control (ETC), which may also be utilized during idle speed control. Engine 10 may further include a compression device such as a turbocharger, including a compressor 81 arranged along intake manifold 42 and a turbine 83 arranged along exhaust manifold 48. Turbine 83 may supply mechanical work to compressor 81 via a shaft, for example. The amount of compression provided to the engine via turbocharging or supercharging may be varied by the control system. Further, intake manifold 42 is shown branching into intake manifold 44b and intake manifold 44a. Intake manifold 44b may include an electronic throttle 63b as described above with reference to main throttle 62. Similarly, intake manifold 44a may include an electronic throttle 63a as shown in FIG. 2.

Intake manifold 44b is further shown including an intake heat exchanger 85 configured to provide thermal energy (i.e. heat) to the air flowing through intake manifold 44b. Thermal energy may be provided to heat exchanger 85 by a variety of sources. In one embodiment, as shown in FIG. 1, an exhaust heat exchanger 86 arranged in exhaust manifold 48 may provide thermal energy to heat exchanger 85. In another embodiment, thermal energy may be provided to heat exchanger 85 by engine coolant. In yet another embodiment, heat exchanger 85 may receive thermal energy via conversion of electrical energy to heat via an electric resistance heater. In some embodiments, the exhaust manifold may not include exhaust heat exchanger 86. It should be appreciated that, throttle 63b may be alternatively located downstream of heat exchanger 85, or engine 10 may not include one or more of throttles 62, 63a, and/or 63b.

In some embodiments, intake manifold 44b may optionally include a temperature sensor between intake valve 52b and heat exchanger 85. The temperature sensor may be used to determine the temperature of the heated intake air with manifold 44b, thereby enabling control of the operation of intake valve 52b and/or the thermal energy provided to the intake air via heat exchanger 85 as will be described below in greater detail. However, it should be appreciated that a temperature sensor may not be included within intake manifold 44b, at least in some embodiments.

Exhaust gas sensor 76 is shown coupled to exhaust manifold 48 upstream of catalytic converter 70. Sensor 76 may be any of many known sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown downstream of exhaust manifold 48. Device 70 may be a three way catalyst (TWC), NOx trap, various other devices, or combinations thereof. In some embodiments, engine 10 may include a vapor recovery system enabling recovery of fuel vapors from a fuel tank and/or fuel vapor storage canister via purge control valve to at least one of intake manifolds 44a and 44b. As will be described herein in greater detail, during operation of engine 10, some emission control devices such as a TWC may be periodically reset by operating at least one cylinder of the engine with an air/fuel ratio that is rich of stoichiometry.

Ignition system 88 can provide an ignition spark to combustion chamber 30 via spark plug 92 in response to spark advance signal SA from controller 12, under select operating modes. Though spark ignition components are shown, engine 10 (or a portion of the cylinders thereof) may be operated in a compression ignition mode, with or without spark assist, as will be explained in greater detail.

Controller 12 is shown in FIG. 1 as a conventional microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100; engine coolant temperature (ECT) from temperature sensor 112 coupled to cooling sleeve 114; a profile ignition pickup signal (PIP) from Hall effect (or other type) sensor 118 coupled to crankshaft 40; throttle position from a throttle position sensor; and absolute manifold pressure signal, MAP, from sensor 122. Engine speed signal, RPM, is generated by controller 12 from signal PIP in a conventional manner and manifold pressure signal MAP from a manifold pressure sensor provides an indication of vacuum, or pressure, in the intake manifold. Note that various combinations of the above sensors may be used, such as a MAF sensor without a MAP sensor, or vice versa. During stoichiometric operation, this sensor can give an indication of engine torque. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft. Controller 12 may be further configured to control the amount of heat supplied to the intake air passing through heat exchanger 85, the position of electronic throttles 44a and 44b, and the amount of boost provided by compressor 81, for example.

As described above, FIG. 1 merely shows one cylinder of a multi-cylinder engine, and that each cylinder may similarly have its own set of intake/exhaust valves, fuel injectors, spark plugs, etc. In an alternative embodiment, a port fuel injection configuration may be used where a fuel injector is coupled to at least one of the intake manifolds for providing port injection, rather than directly to cylinder 30. Further, in the disclosed embodiments, an exhaust gas recirculation (EGR) system may route a desired portion of exhaust gas from exhaust manifold 48 to at least one of intake manifold 42, 44a, and/or 44b via an EGR passage (not shown). Alternatively, a portion of combustion gases may be retained or trapped in the combustion chamber by controlling exhaust valve timing.

Humidity sensing may also be employed in connection with the depicted embodiments. For example, an absolute, or relative, humidity sensor may be used for measuring humidity of the ambient air or intake air. This sensor can be located in one or more of the intake manifolds 42, 44a, or 44b, for example. Also note that humidity may be estimated or inferred based on various operating parameters, such as barometric pressure. Alternatively, humidity can be inferred based on autoignition characteristics via adaptive learning. Further, barometric pressure and adaptive learning can be used in combination, and may also be used with sensed humidity values.

Further, combustion sensing may be used in connection with the depicted embodiment. For example, a combustion sensor may be coupled to the cylinder. In one embodiment, a combustion sensor may be a knock sensor coupled to the head of the cylinder. In another embodiment, a knock sensor may be located on the body of the cylinder. In yet another embodiment, a combustion sensor may be a pressure sensor installed inside the cylinder. Information from one or more combustion sensors may determine types/modes of combustion as described below and indicate whether combustion performed is predefined or desired.

The engine 10 may be controlled to operate in various modes, including lean operation, rich operation, and "near stoichiometric" operation. "Near stoichiometric" operation refers to oscillatory operation around the stoichiometric air fuel ratio. Furthermore, the engine may be controlled to vary operation between a spark ignition (SI) mode and a homogeneous charge compression ignition (HCCI) mode. As will be described in more detail below, controller 12 may be configured to cause combustion chamber 30 to operate in these or other modes. Various operating conditions of the engine may be varied to provide different modes of operation, such as fuel injection amount, fuel injection timing, valve timing, valve lift, EGR intake air heating and/or cooling, turbocharging, throttling, spark timing, turbocharging, etc.

Combustion in engine 10 can be varied by controller 12 depending on operating conditions. In one example, SI mode can be employed where the engine utilizes a sparking device, such as spark plug coupled in the combustion chamber, to regulate the timing of combustion. In another example, HCCI mode or controlled autoignition (CAI) mode may be utilized, where autoignition of an air and fuel mixture is achieve by compression performed by the piston, without necessarily requiring a spark from a spark plug. Typically, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio. While HCCI operation may be used to achieve improved efficiency and reduced emissions, it may be more difficult to achieve HCCI under some conditions. During spark ignition operation, the temperature of the air entering the combustion chamber may be controlled to be lower than the temperature of the intake air used during HCCI mode to achieve autoignition. Thus, SI mode and HCCI mode may utilize different operating conditions for achieving the desired combustion timing.

Referring now to FIG. 2, a schematic diagram of engine 10 is shown. In particular, engine 10 is shown having four cylinders; however, it should be appreciated that the engine may include any suitable number of cylinders. Combustion chamber 30 is shown having two intake valves 52a and 52b, and two exhaust valves 54a and 54b. However, cylinders may include more or less intake and/or exhaust valves. Intake manifold 44a is shown communicating with throttle 63a via intake valve 52a and intake manifold 44b is shown communicating with throttle 63b via intake valve 52b. Intake manifolds 44a and 44b are further shown combining upstream of the combustion chamber to form a common intake manifold 42.

Engine 10 may include one or more throttles. For example, throttle 62 as described above may be used to control the flow of air through intake manifold 42 via a signal from controller 12. Similarly, intake manifold 44a may be configured with throttle 63a and intake manifold 44b may be configured with throttle 63b for controlling the flow of intake air to the cylinders. However, in some embodiments, engine 10 may not include one or more of throttles 62, 63a, and 63b. In yet another alternate embodiment, engine 10 may include an independent throttle for each intake valve of one or more cylinders.

Intake manifold 44b may include a heat exchanger 85 that provides heat to air flowing through intake manifold 44b. Heat may be supplied to heat exchanger 85 by one or more sources. For example, heat may be supplied to heat exchanger 85 via heat recovered by heat exchanger 86 arranged in exhaust manifold 48 and/or engine coolant supplied from an engine coolant system. In this manner, combustion chamber 30 may be configured to receive intake air via two sources, each having substantially different temperatures. Engine 10 may further include a compression device such as turbocharger 80 or alternatively a supercharger. Turbocharger 80 may include a compressor 81 arranged in intake manifold 42 that is powered by turbine 83 arranged in exhaust manifold 48 via shaft 82.

As shown in FIG. 2, each cylinder of engine 10 may be configured to receive intake air via intake manifolds 44a and 44b. Intake air delivered to the combustion chamber via intake manifold 44b may be heated to a higher temperature than the air delivered via intake manifold 44a by varying the amount of heat supplied to intake manifold 44b via heat exchanger 85. In this manner, the intake air supplied via intake manifold 44a may be cooler than the intake air supplied via intake manifold 44b, at least during some conditions. As described herein, intake manifold 44a may be referred to as the "cold" intake manifold and intake manifold 44b may be referred to as the "hot" intake manifold, although these labels are simply relative. For example, the cold intake manifold (i.e. 44a) may supply intake air that is hotter than the ambient air temperature, but cooler than the intake air provided by the hot intake manifold (i.e. 44b). Further, as described herein, intake valve 52a controlling the amount of air delivered to the combustion chamber via intake manifold 44a may be referred to as the "cold" intake valve and intake valve 52b may be referred to as the "hot" intake valve.

As will be described in more detail, various control strategies may be used to vary the combined temperature (e.g. initial charge temperature) of the air delivered to the combustion chamber. In one approach, the initial charge temperature may be increased by increasing the relative amount of intake air supplied via the hot intake manifold 44b compared to the amount of intake air supplied via the cold intake manifold 44a, while maintaining substantially the same total amount of intake air. For example, the amount of the hotter intake air provided via the hot manifold may be increased and the amount of cooler intake air provided via the cold manifold may be decreased by the same proportion.

In another approach, the initial charge temperature may be increased by increasing the relative amount of intake air supplied via intake manifold 44b compared to the amount of intake air supplied via intake manifold 44a, while varying the total amount of intake air provided to the combustion chamber. For example, the amount of the hotter intake air provided by the hot manifold may be increased more than the amount of the cooler intake air provided by the cold manifold, thereby increasing the temperature of the initial charge temperature while providing a greater total amount of air to the combustion chamber. Alternatively, the amount of the hotter intake air provided by the hot manifold may be decreased less than the amount of the cooler intake air provided by the cold manifold, thereby increasing the temperature of the initial charge temperature while providing less total amount of air to the combustion chamber.

In another approach, the initial charge temperature may be decreased by decreasing the relative amount of hotter intake air supplied via intake manifold 44b compared to the amount of cooler intake air supplied via intake manifold 44a, while maintaining substantially the same total amount of intake air provided to the combustion chamber. For example, the amount of the cooler intake air provided via the cold manifold may be increased and the amount of hotter intake air provided via the hot manifold may be decreased by the same proportion.

In yet another approach, the initial charge temperature may be decreased by decreasing the relative amount of hotter intake air supplied via intake manifold 44b compared to the amount of cooler intake air supplied via intake manifold 44a, while varying the total amount of intake air provided to the combustion chamber. For example, the amount of the cooler intake air provided by the cold manifold may be increased more than the amount of the intake air provided by the hot manifold, thereby decreasing the temperature of the initial charge temperature while providing a greater total amount of air to the combustion chamber. Alternatively, the amount of the cooler intake air provided by the cold manifold may be decreased less than the amount of the intake air provided by the hot manifold, thereby decreasing the temperature of the initial charge temperature while providing less total amount of air to the combustion chamber.

Further, in some approaches, the initial charge temperature of the air supplied to the combustion chamber may be adjusted by varying the amount of heat supplied to the hot manifold via heat exchanger 85. For example, the initial charge temperature may be increased without necessarily requiring an adjustment to the amount of air supplied via the hot and/or cold manifolds by increasing the amount of heating provided to the hot manifold via the heat exchanger. Alternatively, the initial charge temperature may be decreased without necessarily requiring an adjustment to the amount of air supplied via the hot and/or cold manifolds by decreasing the amount of heating provided to the hot manifold via the heat exchanger.

Further, in some embodiments, the amount of heat supplied to the hot manifold heat exchanger (e.g. heat exchanger 85) may be varied in response to the amount of air (e.g. mass flow rate or volumetric flow rate, etc.) flowing through the hot manifold. For example, as the amount of air flowing through manifold 44b is reduced or is anticipated to be reduced, for example, by adjusting one or more upstream throttles and/or one or more intake valves (e.g. valve 52b), then the amount of thermal energy supplied to the heat exchanger may be reduced. Conversely, the amount of thermal energy provided to the heat exchanger may be increased in response to an increase or anticipated increase in the flow rate of air through heated manifold. In each of these examples, the amount of thermal energy supplied to the heat exchanger may be varied, for example, by increasing the amount of electrical energy supplied to the heat exchanger if electric heating elements are included or may vary one or more valves controlling the amount of heated exhaust gas and/or heated engine coolant that is supplied to the heat exchanger if fluid to fluid heat transfer is used.

It should be appreciated that the amount of air delivered via the hot and cold manifolds may be varied by adjusting at least one of valve operation (e.g. lift height, lift duration, valve timing) of intake valves 52a and/or 52b, position of throttles 62, 63a, and/or 63b, and/or the amount of turbocharging provided to the intake manifolds. For example, the amount of air provided to the combustion chamber by an intake manifold may be increased by increasing at least one of lift and/or lift duration for the respective valve. Additionally or alternatively, the amount of air provided to the combustion chamber, for example, by intake manifold 44a may be decreased by adjusting throttle 63a or main throttle 62.

Figure 3:
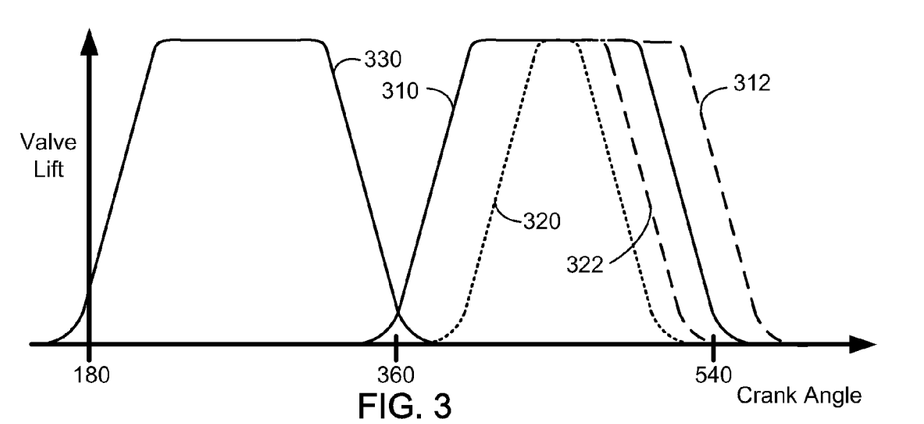
FIGS. 3, 4 and 5 are graphs showing example valve operations.
Figure 4:
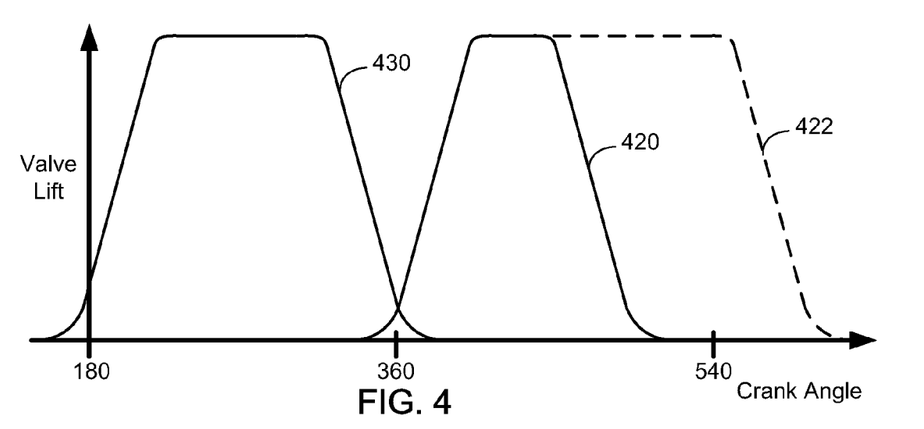
Figure 5:
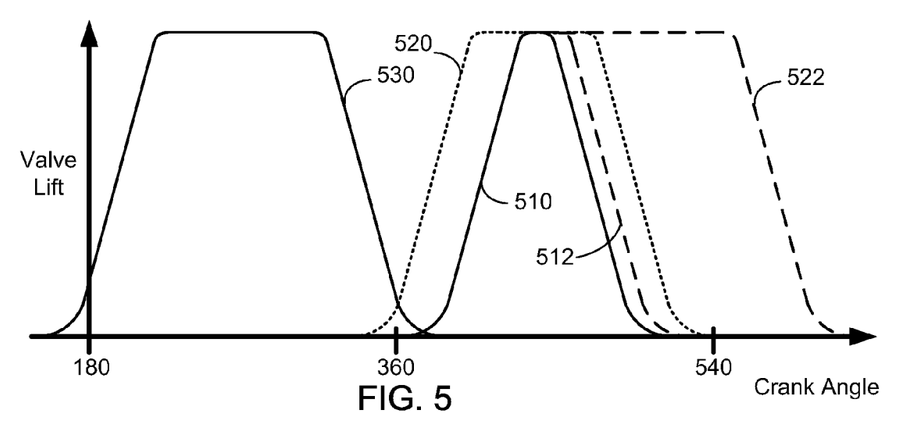

FIGS. 3, 4, and 5 are graphs showing example valve operations utilizing EVA for at least an intake valve providing heated air and an intake valve providing cooler air to the combustion chamber. In particular, the position of intake valves 52a and 52b are shown with respect to crankshaft angle. The exhaust stroke of the cycle is shown generally occurring between 180 degrees bottom dead center (BDC) and 360 degrees (TDC) crank angle. The intake stroke of the cycle is shown generally occurring between 360 degrees TDC and 540 degrees BDC crank angle. Further, a closed valve corresponds to a lift of zero or no lift in FIGS. 3-5, while a positive lift corresponds to the valve being in an open position, thereby enabling intake air to flow into the combustion chamber where intake valve lift is indicated or enabling exhaust gases to flow out of the combustion chamber where exhaust valve lift is indicated.

FIG. 3 shows an example valve operation that may be used at least during HCCI mode. At 310, the lift provided to hot intake valve 52b as controlled by electric actuator 50b is shown, while at 312, the position of intake valve closing is shown at a later or retarded timing relative to the intake valve closing of 310. The lift provided to cold intake valve 52a as controlled via EVA is shown at 320, while the lift provided to intake valve 52a is shown at 322 with a retarded intake valve closing timing relative to the intake valve closing of 320. In this condition, the hot intake valve may be referred to as the dominant valve since it may provide the majority of the intake air to the combustion chamber. In this manner, more heated air may be provided to combustion chamber 30 via valve 52b than cooler via valve 52a. Valve timing advance or retard may be achieved by varying the timing of the valve control signals provided to the respective electric actuators controlling intake valves 52b and 52a, for example. Further, an example lift profile of at least one of exhaust valves 54a and 54b is shown at 330. It should be appreciated that the examples shown in FIG. 3 are merely a non-limiting examples of valve operations that may be performed.

FIGS. 4 and 5 show examples valve operations that may be used at least during SI mode. In particular, FIG. 4 shows valve operation where hot intake valve 52b is held substantially closed while intake valve cold 52a provides substantially all of the air charge to the cylinder. In this manner, the air charge provided to the cylinder may be regulated by the cold valve, while the amount of heated air provided to the cylinder may be reduced and/or minimized to enable improved efficiency in SI mode. However, during some conditions, it may be desirable to allow at least some heated air to flow into the cylinder via intake valve 52b so that stagnation of the air within exhaust passage 44b does not occur. FIG. 5 shows an alternative valve operation where intake valve 52b is operated with a short duration during SI mode in order to maintain a ready reserve of heated air.

For example, FIG. 4 shows the cold intake valve 52a providing substantially all of the intake air as shown at 420. Instead of early valve closing timing (e.g. at 420), the same amount of air in the cylinder may be retained by operating the intake valve lift profile with late intake valve closing timing (e.g. at 422). An example lift profile of at least one of exhaust valves 54a and 54b is shown at 430. FIG. 5 shows, at 510, the lift provided to hot intake valve 52b as controlled by electric actuator 50b, while at 512, the position of intake valve 52b is shown at a retarded valve closing timing relative to the valve closing timing of 510. The lift provided to cold intake valve 52a as controlled via EVA is shown at 520, while the lift provided to intake valve 52a is shown at 522 with a retarded intake valve timing relative to the intake valve timing of 520. Valve timing advance or retard may be achieved by varying the timing of the valve control signals provided to the respective electric actuators controlling intake valves 52b and 52a, for example. Further, an example lift profile of at least one of exhaust valves 54a and 54b is shown at 530. In FIGS. 4 and 5, the cold intake valve 52a is shown having a longer lift duration than the hot intake valve 52b. In this condition, the cold intake valve may be referred to as the dominant valve since it may provide the majority of the intake air to the combustion chamber. In this manner, less heated air may be provided to combustion chamber 30 via valve 52b than cooler air via valve 52a. It should be appreciated that the examples shown in FIGS. 4 and 5 are non-limiting examples of valve operations that may be performed during SI mode.

In some examples, the initial temperature of the charge delivered to the combustion chamber may be varied by adjusting the valve timing between the advanced and retarded intake valve closing timings. As will be described in greater detail, transitions between various modes may also be facilitated by varying the valve timing and/or lift duration via EVA.

The example approaches described herein may be used to facilitate transitions between various modes and/or may be used to maintain operation in a particular mode. For example, during operation in HCCI mode, it may be desirable to exercise close control over the timing of autoignition. In contrast to a compression ignition operation of a diesel type engine, the start of autoignition may not necessarily initiated by the injection of fuel, but may instead be autoignited when compressed by the piston. Similarly, a spark is not necessarily performed by a sparking device as may be used with an engine configured for spark ignition. Thus, during HCCI, the heat release rate may not be substantially controlled by either the rate or duration of the fuel-injection process, as in a diesel type engine, or by the turbulent flame propagation time, as in a spark-ignited engine. Instead, the timing of autoignition may be controlled by varying the charge temperature via intake and/or exhaust valve timing as may be provided by EVA, among other control operations.

In some conditions, autoignition may cause knock. Knock may be undesirable in some engines because it enhances heat transfer within the cylinder and may burn or damage the piston. In HCCI mode, with its high air/fuel ratio, knock does not generally cause degradation of the engine because the diluted charge reduces the rate of pressure rise and the maximum temperature of the burned gases. The lower rate of pressure rise mitigates the damaging pressure oscillations characteristic of spark ignition knock.

In comparison to a spark ignition engine, the temperature of the charge at the beginning of the compression stroke typically may be increased to reach autoignition conditions at or near the end of the compression stroke (e.g. around 360 degrees TDC). It will be appreciated by those skilled in the art that numerous other methods may be used to elevate initial charge temperature. For example, the heat exchanger configured to provide thermal energy to the hot intake manifold may be used to elevate the intake air temperature. Some other methods may include; keeping part of the warm combustion products in the cylinder (internal EGR) by adjusting intake and/or exhaust valve timing, compressing the inlet charge (turbocharging or supercharging), changing the autoignition characteristics of the fuel provided to the engine, and/or heating the intake air charge (external EGR).

As described above, engine 10 may be configured to operate in a plurality of modes. In some embodiments, engine 10 may be configured to selectively vary operation between SI mode and HCCI mode by utilizing the intake valve control methods described above with reference to FIGS. 3, 4 and/or 5. For example, the intake valve operation shown in FIG. 3 may be used during HCCI mode to provide an initial air charge having a higher temperature for enabling autoignition while during SI mode, the intake valve operation shown in FIG. 4 or 5 may be used to provide decreased charge heating, thereby reducing engine knock and increasing efficiency. However, in some embodiments, as shown at 510 in FIG. 5, hot intake valve 52b may be controlled so that at least some heated air is allowed to flow to the combustion chamber, thereby reducing stagnation within the hot manifold and maintaining a ready reserve of heated air. Transitions between HCCI mode and SI mode may be performed by at least varying the intake valve operation between FIGS. 3 and FIG. 4 or 5 via EVA control.

Figure 6:
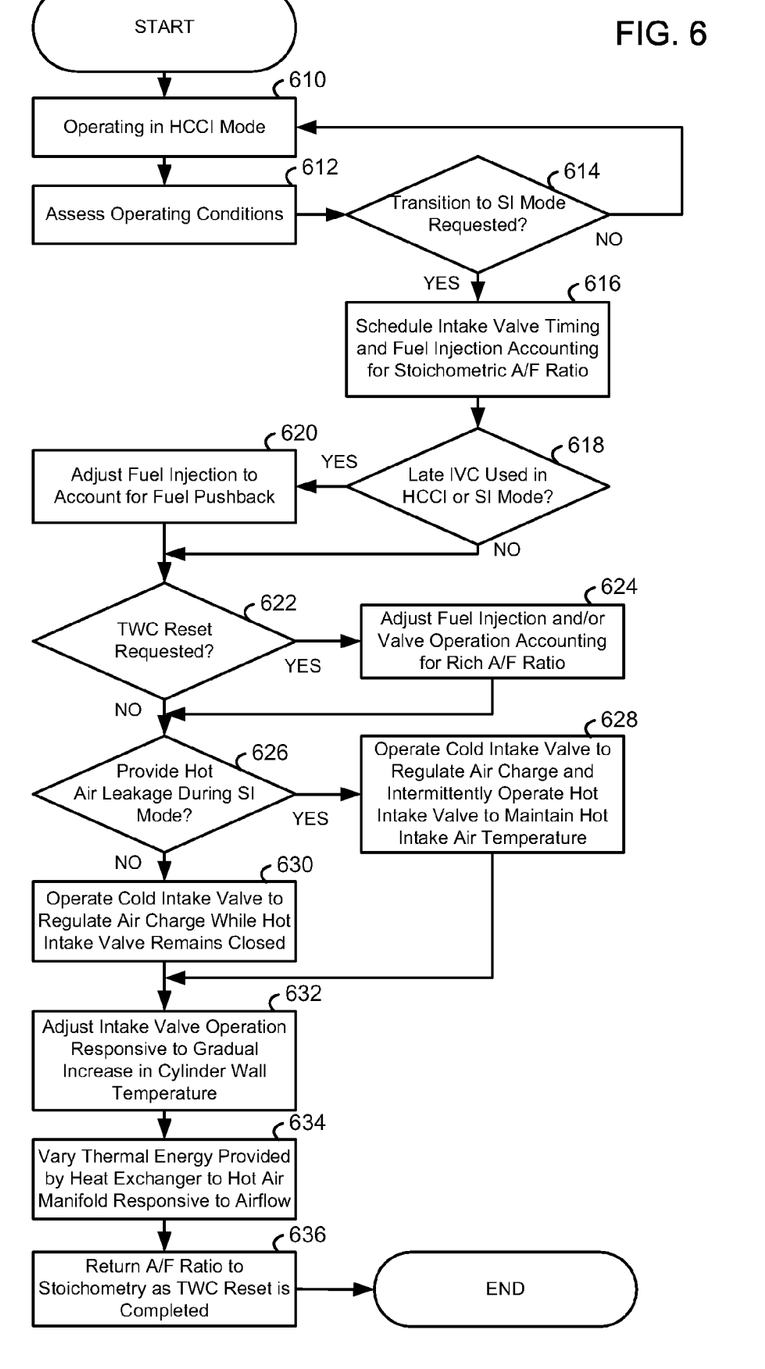
FIGS. 6 and 7 show example flow charts describing control routines for performing mode transitions.
Figure 7:
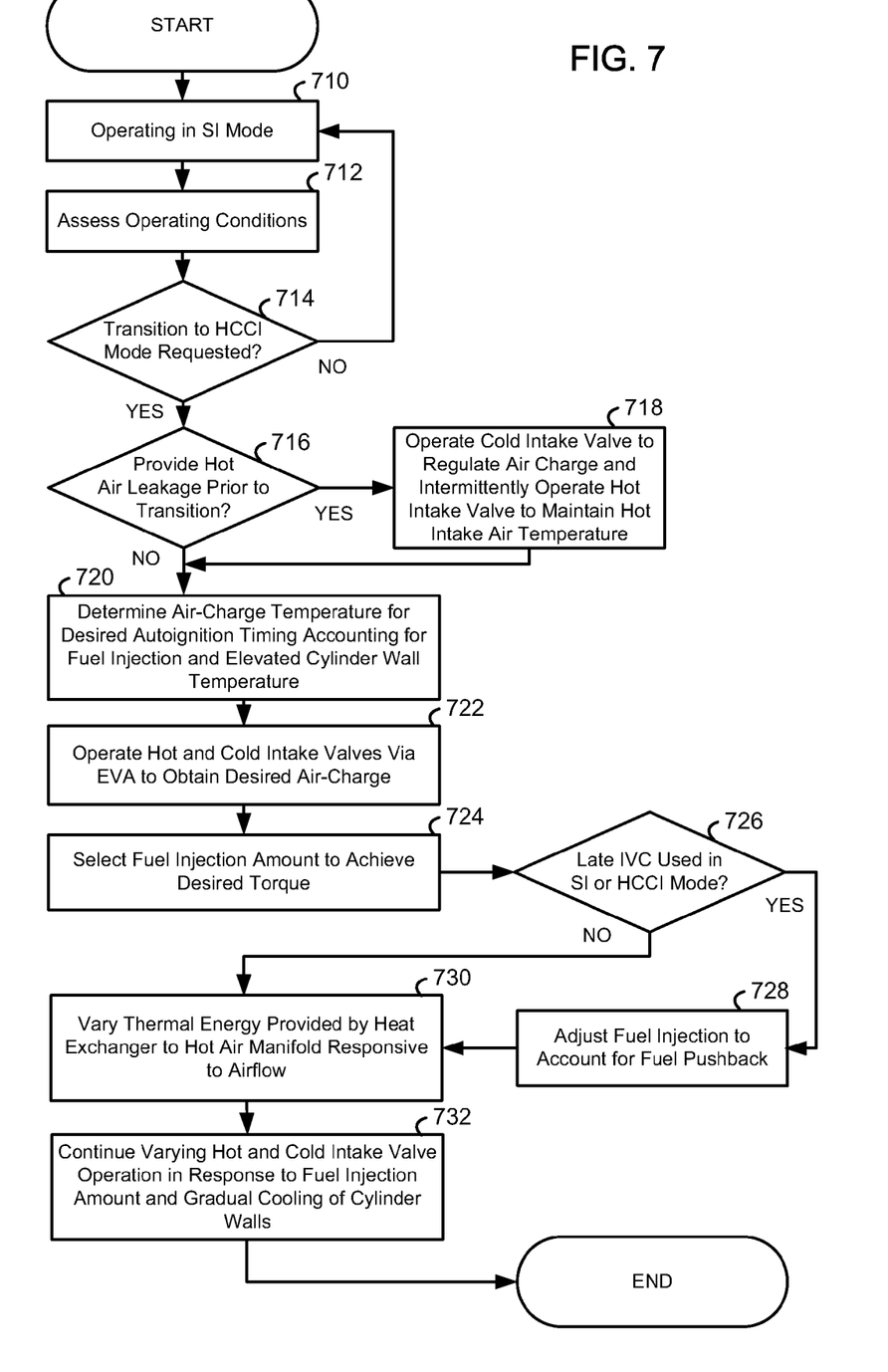

FIGS. 6 and 7 are flowcharts describing example routines for performing transitions between SI mode and HCCI mode. These routines generally seek to reduce and/or minimize disturbances such as torque fluctuations and/or NVH as a result of transitions between these modes of operation.

For example, FIG. 6 describes a routine for performing a transition from HCCI mode to SI mode with the example configuration of engine 10. While the various control methods described herein for facilitating transitions from HCCI mode to SI mode may be applied on an individual cylinder basis, it should be appreciated that these methods may be similarly applied to some or all of the engine cylinders. Beginning at 610, at least one cylinder of the engine is initially operating in HCCI mode. During HCCI mode operation, the cylinder may be operating with the valve operation described above with reference to FIG. 3, for example. At 612, the operating conditions of the cylinder, the engine and/or the vehicle may be assessed, for example, by the various sensors communicatively coupled to the control system described above with reference to FIG. 1. At 614 it may be judged whether a transition to SI mode is requested in response to the operating conditions assessed at 612. If the answer is no, the routine may return to 610 where HCCI mode is performed.

Alternatively, if the answer at 614 is yes, the intake valve timing and/or fuel injection for the first cycle in HCCI mode may be scheduled at 616. For example, the intake valve operation may be controlled as shown in FIG. 4, wherein the cold intake valve is operated to regulate the air charge, while the fuel injection amount may be selected responsive to the scheduled intake valve operation to achieve a stoichiometric air/fuel ratio in SI mode. The valve lift duration and timing may be selected while accounting for cooler cylinder walls from the previous operation in HCCI mode as will be described in greater detail with reference to FIG. 9. Because the engine may run lean air-fuel ratio in the HCCI mode and stoichiometric or rich in the SI mode, the amount of air provided to the cylinders may be reduced upon the switch from the HCCI mode to the SI mode. As illustrated in FIG. 4, this may be accomplished by operating the intake valves in the SI mode with either early intake valve closing (e.g. at 420) or late intake valve closing (e.g. at 422). At 618, it may be judged whether a change in intake valve closing (IVC) between the last cycle of HCCI mode and the first cycle of SI mode is going to occur for each (hot and cold) set of intake valves. For example, the intake valve closing for the cold valve may be advanced (e.g. 320 or 322 in FIG. 3) in the HCCI mode and retarded (e.g. 422 in FIG. 4) in the SI mode. For example, the intake valve timing may be retarded for one or more cycles prior to the transition to regulate air charge temperature and/or torque, or to reduce NVH that may occur through the transition. If the answer at 618 is yes, the fuel injection may be adjusted at 620 to account for the difference in fuel pushback from the last HCCI cycle prior to the mode switch and the first cycle in the SI mode after the switch. For example, if a substantially retarded IVC is used in the SI cycle compared to the last HCCI cycle, then the amount of fuel injected during the first SI cycle may be increased from the amount scheduled at 616.

In one approach, the fuel injected into the cylinder may based on a difference of a first sum of fuel pushed back into the hot and the cold intake passages during a first cycle and a second sum of fuel pushed back into the hot and cold intake passages during a second cycle. The mass of fuel pushed back into the hot intake passage may be proportional to the mass of fuel in the cylinder at the bottom dead center of the intake stroke and the volume swept by the piston between the bottom dead center and the hot intake valve closing (IVC). Similarly, the mass of fuel pushed back into the cold intake passage may be proportional to the mass of fuel in the cylinder at the bottom dead center of the intake stroke and the volume swept by the piston between the bottom dead center and the cold intake valve closing (IVC). In this manner, the amount of fuel pushback may be tracked separately for the hot and cold intake passages based on their respective valve timings.

At 622, it may be determined whether a TWC reset is requested. If the answer is yes, then the fuel injection and/or intake valve operation may be adjusted at 624 to account for a richer than stoichiometric air/fuel ratio. A TWC reset is generally performed by operating at least one cylinder of the engine rich of stoichiometry for one or more cycles in order to produce excess hydrocarbons in the exhaust. Since HCCI mode generally utilizes a lean of stoichiometry air/fuel ratio, the engine or at least one cylinder thereof may be transitioned to SI mode so that a momentary rich air/fuel operation may be achieved. After the TWC reset is performed, the engine or at least one cylinder thereof may be transitioned back to HCCI mode. Since HCCI mode operation may be more efficient than SI mode, it may be desirable to reduce the amount of time that one or more cylinders of the engine are operated in SI mode. TWC reset may be initiated relatively soon after transitioning to SI mode.

If a TWC reset is requested at 622, then the intake valve timing and the fuel injection for the subsequent SI mode cycle may be adjusted at 624 accounting for a richer than stoichiometric air/fuel ratio. For example, the amount of fuel delivered to the combustion chamber during one or more cycles during the TWC reset may be increased and/or the amount of air delivered to the combustion chamber via the intake valves may be decreased.

At 626, it may be judged whether to provide hot air to the combustion chamber via the hot intake valve during SI mode. As described above with reference to FIG. 5, a small valve lift and/or lift duration may be used to provide a relatively small amount of heated air to the cylinder to provide for a ready reserve of heated air in the hot intake manifold. If the answer at 626 is yes, at 628, the cold intake valve may be operated, for example, as shown in FIG. 5 while the hot intake valve provides a small amount of heated air to the combustion chamber. In some embodiments, the valve operation of FIG. 4 may be transitioned to the valve operation of FIG. 5 by control the EVA of the cold intake valve so that the amount of cold air is decreased in proportion to the amount of air leaked by the hot intake valve. Alternatively, if the answer at 630 is no, then at 630, the cold intake valve may be operated to provide substantially all of the air charge while the hot intake valve is held closed as shown in FIG. 4, for example.

At 632, the operation of the intake and/or exhaust valves may be controlled via EVA to account for decreased charge cooling from the cylinder walls as the cylinder wall temperature gradually increases over one or more cycles after the transition to SI mode is performed. For example, the amount of heated air provided via the hot valve may be reduced while the cooler air provided by the cold valve is increased.

At 634, the amount of heating (e.g. thermal energy) supplied to the air passing through the hot air manifold by the heat exchanger may be varied in response to the flow rate of hot air. The amount of heating provided by the heat exchanger may be adjusted in response to the operation of the hot air intake valve (e.g. intake valve 52b). For example, if the hot intake valve is operated to leak air into the combustion chamber (e.g. as shown at 628), then the heat exchanger may be operated to provide a first amount of intake air heating (e.g. amount of thermal energy). Alternatively, if the hot intake valve is operated so that less heated air or no heated air is provided to the combustion chamber (e.g. as shown at 626), then the heat exchanger may be operated to provide a second amount of intake air heating different from the first amount. While operation of the heat exchanger may be varied at 634 (i.e. after the transition to SI mode is performed), it should be appreciated that operation of the heat exchanger may be varied before the transition, for example, in response to an anticipated change in the flow rate of heat intake air.

At 636, the air/fuel ratio may be returned to stoichiometry as the TWC is completed. In some embodiments, the TWC reset may be performed over a plurality of cycles after the transition to SI mode is performed. The return of the air/fuel ratio may be performed over one or more cycles by reducing the amount of fuel and/or increasing the amount of air provided to the combustion chamber. For example, the lift duration provided to one or both intake valves may be increased to provide more air to the cylinder. Finally, the routine may end.

In this way, intake air temperature may be controlled by responding to a request for a rapid adjustment of intake air temperature by at least varying valve operation via EVA and a request for a less rapid adjustment of intake air temperature by at least varying throttle position and/or the amount of heating provided to the intake air by the heat exchanger.

Referring now to FIG. 7, an example routine is provided for facilitating a transition of a cylinder such as cylinder 30 described herein from SI mode to HCCI mode. At 710, the cylinder may be initially operating in SI mode. During SI mode operations, the valves may be operated as described above with reference to FIG. 4 or 5, for example. At 712, the operating conditions may be assessed, for example, by the control system. At 714 it may be judged whether a transition to HCCI mode is requested based on the assessment of operating conditions from 712. If the answer is no, the routine may return to 710 where SI mode is performed.

Alternatively, if the answer at 714 is yes, it may be judged whether to leak heated air to the cylinder via the hot intake valve (e.g. valve 52b) prior to the transition to ready the hot intake manifold for HCCI mode. As described above, if the intake valves are operated such that the hot intake valve is held closed for a period of time (e.g. the valve operation of FIG. 4), then the air within the hot intake manifold may cool. If the answer is yes, the intake valves may be operated at 718 for one or more cycles before the transition, for example, as shown in FIG. 5 via their respective EVA. For example, the cold intake valve may be used to provide a substantial portion of the air charge, while the hot valve is controlled to provide a small portion of heated air to purge the hot intake manifold. However, the amount of heated air provided via the hot valve may be controlled so that preignition is reduced. In some embodiments, the hot valve may be operated for one or more cycles prior to the transition in order to purge the hot manifold and provide a ready reserve of heated air for operation in HCCI mode. Additionally or alternatively, the amount of intake air heating performed by the heat exchanger may be adjusted in response to the anticipated transition and/or the anticipated increase in the flow rate of heated air as will be shown at 730.

Alternatively, if the answer at 716 is no, then the air-charge temperature (e.g. initial charge temperature) may be determined for the desired autoignition timing at 720, accounting for the amount of fuel injected and/or the potentially elevated cylinder wall temperature from the previous SI mode operation. The initial charge temperature may be selected so that autoignition is achieved at the desired timing. At 722, the hot and cold intake valves may be operated via their respective EVAs to obtain the desired air-charge amount and initial temperature. At 724, the fuel injection amount may be selected for the desired torque. Before the fuel is injected for the first HCCI mode cycle, it may be judged at 726 whether late IVC was used in the last cycle or cycles in SI mode or in HCCI mode. If the answer is yes, the amount of fuel injected into the cylinder for the first HCCI mode cycle may be adjusted at 728 to account for fuel pushback from the previous cycle. In one approach, the amount of fuel injected for the first cycle in HCCI mode may be reduced with increased IVC retard used in the previous cycle in SI mode.

If the answer at 726 is no, then at 730 the amount of heating provided by the heat exchanger may be varied responsive to the flow rate of air through the hot air manifold and/or responsive to the operation of the hot valve.

At 732, operation of the hot and/or cold intake valves may be varied over one or more cycles after the transition in response to the fuel injection amount and/or gradual cooling of the cylinder walls. For example, as the requested torque is increased, the amount of fuel delivered in subsequent cycles after the transition to HCCI mode may be increased. In response to an increase in the amount of fuel delivered to the cylinder, the absolute amount of air delivered via the hot and cold valves may be varied as well as the relative amounts of air provided by the hot and cold valves to maintain the desired autoignition timing. In this manner, torque may be controlled at least partially by the amount of fuel and the absolute amount of air delivered to the cylinder and the timing of autoignition may be controlled at least by the relative amounts of hot and cold air. Finally, the routine may end.

In examples described above with reference to FIGS. 6 and 7, it should be appreciated that the heating provided by the intake air heat exchanger (e.g. heat exchanger 85) may be varied in response to the gradual heating and/or cooling of the cylinder walls. For example, as the gradually heating and/or cooling may occur over a plurality of cycles, the desired temperature adjustment may be performed by varying the amount of thermal energy provided to the intake air flow. However, it should be appreciated that operation of the valves and/or throttles may be used in addition to or as alternatives to heat exchanger control to provide the desired charge temperature.

In summary, FIGS. 6 and 7 provide example methods for transitioning at least one cylinder of the engine between HCCI and SI modes. This method generally includes active control of intake valve operation via EVA where the air charge and/or fuel supplied to the combustion chamber are varied to achieve the desired autoignition timing in HCCI mode and the desired A/F ratio for TWC reset in SI mode. Further, valve operation, throttle position, and/or heat exchanger operation may be adjusted via one or more cycles after the transition accounting for the gradual heating or cooling of the cylinder walls.

One example of an application involving at least the two combustion modes presented above may include the use of SI for startup and/or after engine startup during an engine warming period. After such engine startup and engine warming, the combustion process may transition to HCCI mode for improved fuel economy and emissions. During periods of high engine torque requirements, the engine may transition one or more cylinders to SI mode or may utilize a spark assist operation to ensure proper autoignition timing in HCCI mode. As the engine is returned to a low or moderate torque requirement, the cylinders may be transitioned back to HCCI mode and/or the involvement of spark assist may be discontinued in order to realize the full benefits of HCCI. While one or more of the above combustion modes may be used in some examples, still other combustion modes may be used, such as stratified operation, either with or without spark initiated combustion.

Figure 8A:
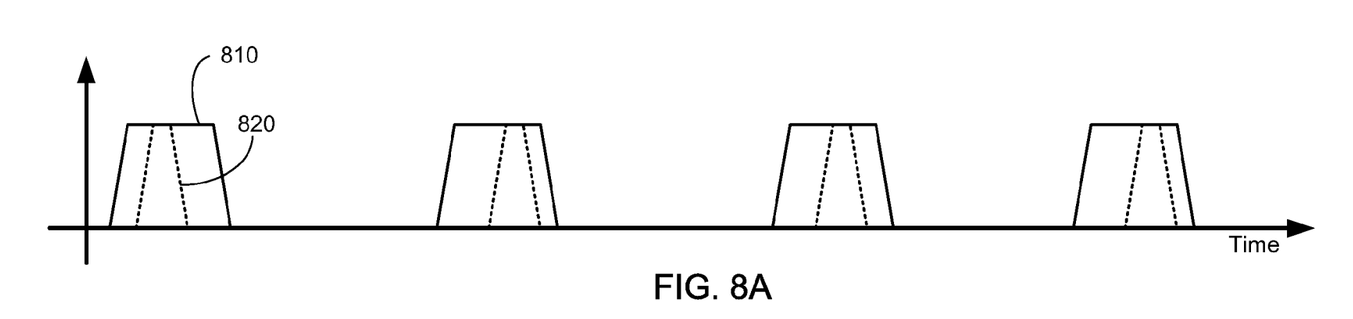
FIGS. 8A, 8B, and 8C show timing diagrams of example intake valve operations.

FIGS. 8A, 8B, and 8C show timing diagrams representing non-limiting examples of intake valve operation that may be used with the engine system described herein. FIG. 8A shows a first example operation where the cylinder is operated in SI mode. The cold intake valve (e.g. 52a of FIG. 1) operation is shown at 810 occurring periodically over a plurality of cycles. Similarly, hot intake valve (e.g. 54b of FIG. 1) operation is shown at 820 occurring periodically over a plurality of cycles. Thus, in this example, the intake valves are operated as described above with reference to FIG. 5. As shown in FIG. 8A, the cold intake valve can be used to provide the majority of intake air to the cylinder while hot intake valve is operated to leak a substantially smaller amount of heated air into the cylinder, thereby maintaining at least some flow of intake air through the heat exchanger. In this manner, the temperature of the heated air within the hot manifold may be maintained.

Figure 8B:
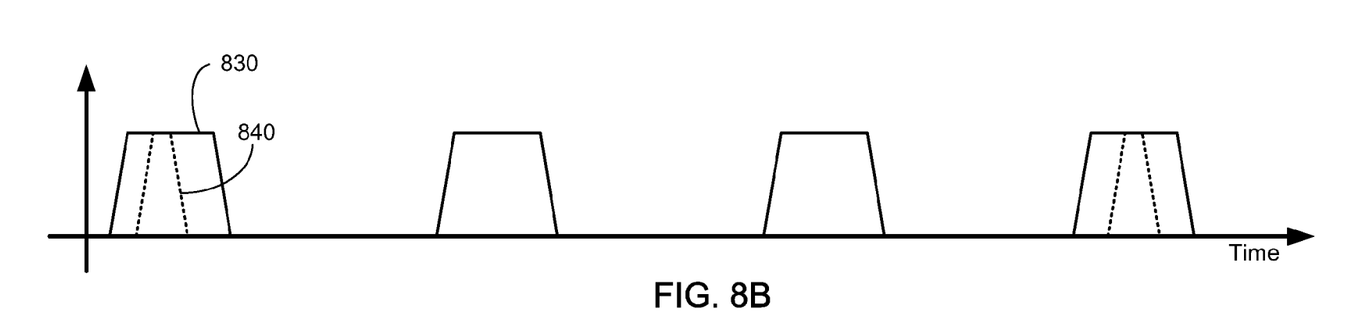

FIG. 8B shows how the hot valve can be operated intermittently at 840 with respect to the cold valve operation shown at 830. For example, the hot valve may not necessarily be operated every cycle. Further, the timing of at least one of an opening and a closing event and/or the lift of the hot valve may be varied with respect to the cold valve. As shown in FIG. 8B, the hot valve is operated along with the cold valve during the first event or cycle (e.g. as shown in FIG. 5), where the operation of the hot valve is discontinued for two cycles (e.g.

as shown in FIG. 4) before being operated again for a cycle. As the hot intake valve is intermittently operated, the cold intake valve may also vary operation, for example, to maintain a similar total amount of air to the cylinder. For example, the cold valve may be operated with a first opening and/or closing event timing, valve lift and/or lift duration when the hot valve is not operated and the cold valve may be operated with a second different opening and/or closing event timing, valve lift, and/or lift duration when the hot valve is operated. As one example, when the hot intake valve is operated, the cold intake valve may be operated to enable a first amount of air into the cylinder; while during a cycle where the hot intake valve is not operated, the cold intake valve may be operated to enable a second greater amount of air into the cylinder. Further, it should be appreciated that any suitable number of cycles may commence between operation of the hot intake valve. For example, the intermittent operation of the hot valve may vary frequency with regards to the operation of the cold valve.

As one example, the control system may selectively utilize the intermittent operation of the hot intake valve to maintain the desired intake manifold temperature. Thus, by controlling at least the hot intake valve via EVA, the amount of heated air supplied to the cylinder may be controlled so as to intermittently occur. At least where the cold intake valve is also controlled by EVA, the operation of the cold valve may be varied responsive to the operation of the hot valve. As such, the frequency, lift, lift duration, and/or timing relative to the hot intake valve can be varied in response to various operating conditions. For example, the hot intake valve may be operated to provide a greater flow of heated air to the combustion chamber in response to the amount of heating provided to the intake air by the heat exchanger.

Figure 8C:
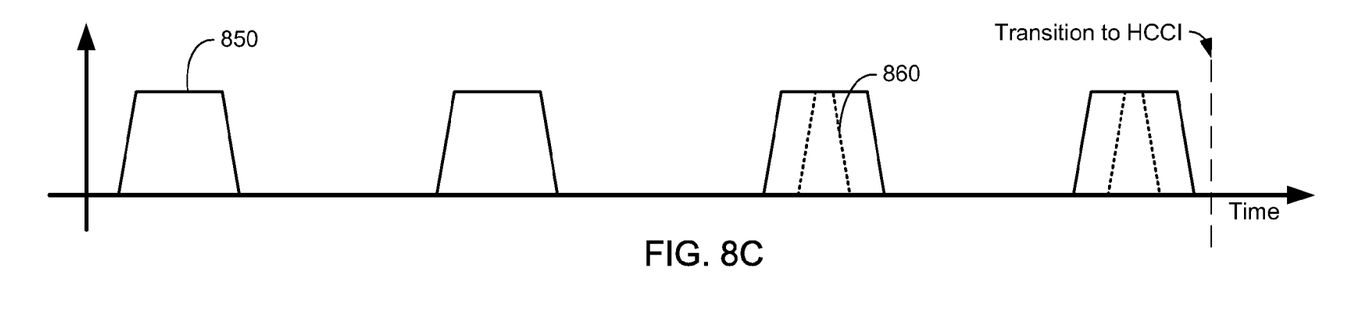

FIG. 8C also shows how the operation of the hot valve shown at 860 can be operated intermittently with respect to the operation of the cold valve 850. In particular, FIG. 8C shows how the hot valve may be operated to leak heated air to the cylinder in response to an impending transition to HCCI mode. For example, the cold intake valve can be operated, for example, during SI mode as described above with reference to FIG. 4. In response to a transition to HCCI mode, the cold and hot intake valves may be operated as described above with reference to FIG. 5 in order to leak heated air into the cylinder over one or more cycles prior to the transition, thereby enabling a ready supply of heated air for the subsequent transition to HCCI mode.

In some example, the amount of thermal energy provided to the heated air by one or more heat exchangers may be varied in response to the operation of the hot intake valve. For example, in the example intake valve operation of FIG. 8C, the amount of heat provided to the intake air flowing through the heat exchanger may be increased for one or more cycles prior to a transition to HCCI mode.

As described above with reference to FIGS. 1 and 2, the hot intake manifold (e.g. manifold 44b can supply heated air to a plurality of cylinders. Thus, it should be appreciated that the valve control operations described above can also be applied to the plurality of cylinders. For example, each of the cylinders of the engine may utilize intermittent operation of the cylinder's corresponding hot intake valve to maintain the temperature of the intake air with the manifold 44b, thereby reducing stagnation of the intake air during some operating modes such as SI. Alternatively, only the hot intake valves of some of the cylinders may be intermittently operated to maintain intake air temperature while some of the hot intake valves of the other cylinders may be held closed and/or provide less leakage of heated air. In this manner, heated air may be selectively provided only to some of the cylinders (e.g. 1, 2, or 3 cylinders of a 4 cylinder engine), while the other cylinders receive at least some of the heated air.

In one approach, selective operation of the intake valves may be used with an engine adapted to deactivate at least some of the cylinders. For example, engine 10 described herein may be configured to deactivate (e.g. at least halt combustion) one or more cylinders, which may be referred to as a variable displacement engine (VDE). In this example, the hot intake valves (i.e. the valves controlling the higher temperature air stream) of the deactivated cylinders may be selectively operated to provide at least some intake air from the hot manifold while the intake valves of the active cylinders are operated so that they receive less heated air, thereby maintaining the temperature of the heated intake air while reducing the amount of heated air provided to the cylinders carrying out combustion. In this manner, the deactivated cylinders can provide a route for the majority of the heated air that is leaked from the hot air manifold, at least during some operating modes, such as SI.

In another approach, selective operation of the intake valves may be used with an engine adapted to operate some of the cylinders in a first mode (e.g. SI mode) and some of the cylinders in a second mode (e.g. HCCI mode). During this operation, the hot intake valves of the cylinders operating, for example, in the HCCI mode may be operated to supply substantially more heated air to the cylinders than the cylinders operating in SI mode. For example, the intake valves of one or more cylinders that are operating in SI mode may be controlled as described above with reference to FIG. 4, while the intake valves of one or more cylinders that are operating in HCCI mode may be controlled as described above with reference to FIG. 3. In this manner, a ready reserve of heated air may be maintained while reducing the amount of heated air that is supplied to the cylinders operating in SI mode.

Figure 9A:
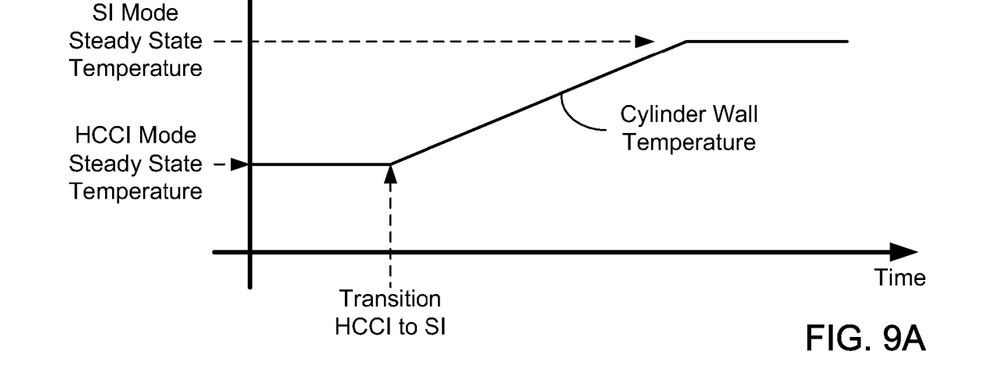
FIGS. 9A, 9B, and 9C show graphs of cylinder wall temperature for different control scenarios.
Figure 9B:
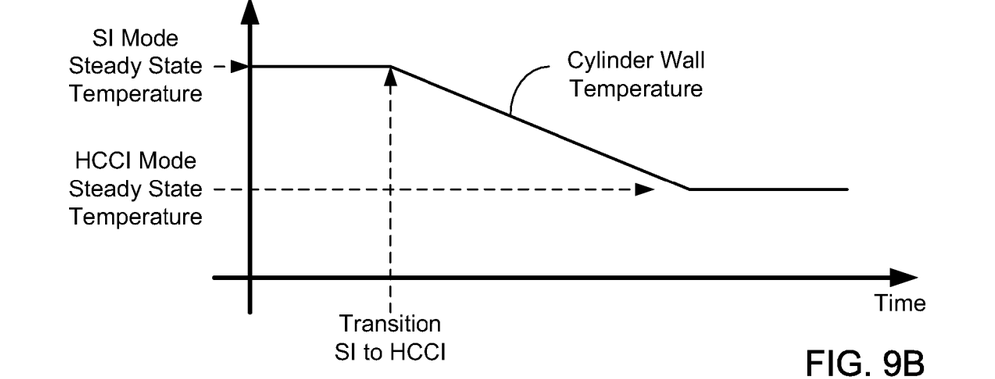
Figure 9C:
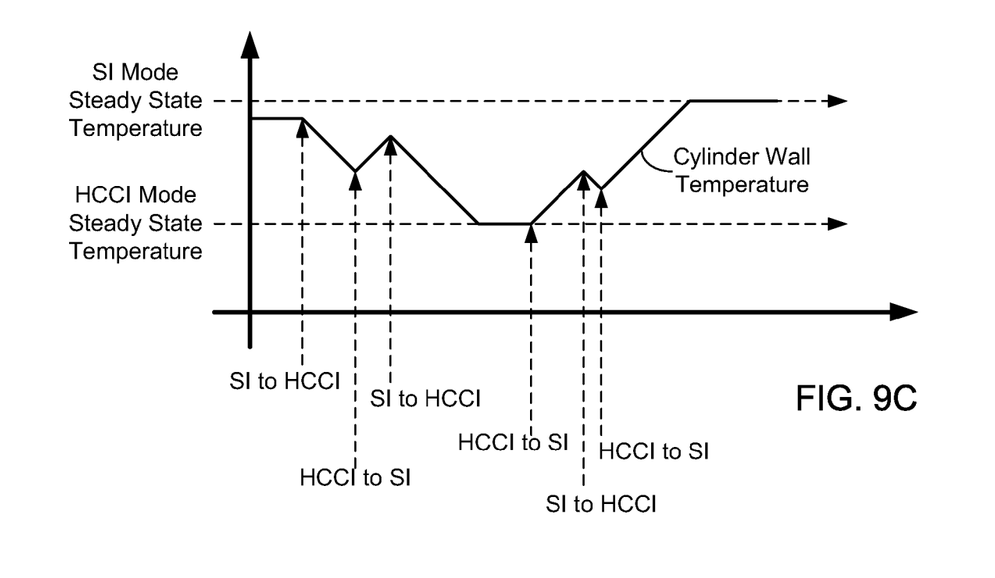

In some conditions, operation in SI mode may generate higher cylinder wall temperatures than operation in HCCI mode. Transitions between SI and HCCI modes may therefore result in the cooling or heating of the cylinder walls, which may occur over one or more cycles after the transition. FIGS. 9A, 9B, and 9C show graphs of cylinder wall temperature compared to time for example scenarios involving transitions between SI and HCCI modes. For example, FIG. 9A shows the temperature of a particular portion of the example cylinder wall for HCCI mode, SI mode, and a transition there between. The cylinder is shown initially operating in HCCI mode, wherein the wall temperature is at an approximately steady state temperature or thermal equilibrium. At a later time, the cylinder is transitioned from HCCI mode to SI mode, wherein the cylinder wall temperature is shown to increase with time until reaching a second higher steady state temperature in SI mode. While the cylinder wall temperature is shown to increase linearly in FIG. 9A, the cylinder wall temperature may alternatively increase non-linearly in some examples.

FIG. 9B shows the temperature of a particular portion of the example cylinder wall for SI mode, HCCI mode, and a transition there between. The cylinder is shown initially operating in SI mode, wherein the wall temperature is at an approximately steady state temperature or thermal equilibrium prior to a transition to HCCI mode. At a later time, the cylinder is transitioned from SI mode to HCCI mode, wherein the cylinder wall temperature is shown to decrease with time until reaching a second lower steady state temperature in HCCI mode. While the cylinder wall temperature is shown to decrease linearly in FIG. 9B, the cylinder wall temperature may alternatively decrease non-linearly in some examples.

During operation of the engine, the cylinder wall temperature may vary between the higher wall temperature in SI mode and the lower wall temperature of HCCI mode. For example, FIG. 9C shows the temperature of a particular portion of the example cylinder wall during an example engine operation. The cylinder is shown initially operating in SI mode. At a later time, the cylinder is transitioned from SI mode to HCCI mode, wherein the cylinder wall temperature is shown to decrease with time until a transition from HCCI mode to SI mode is performed. During SI mode, the cylinder wall temperature is shown to increase with time until a second transition from SI mode to HCCI mode is performed, wherein the temperature may again decrease in HCCI mode until reaching a state of thermal equilibrium.

Therefore, as described above with reference to FIGS. 6 and 7, the control system may adjust one or more operating conditions of the cylinder responsive to the cylinder wall temperature. For example, the control system may be configured to vary valve timing, EGR amount, turbocharging, spark timing, intake air temperature, heat exchanger conditions, throttle position and/or various other engine operating conditions responsive to an estimation and/or measurement of the cylinder wall temperature so that the desired autoignition timing is achieved during HCCI mode and/or preignition is reduced during SI mode.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an engine having at least one cylinder, the method comprising:
   directing a first air stream to an intake valve of the cylinder;
   directing a second, separate air stream to a second intake valve of the cylinder, said second air stream at a higher temperature than said first air stream;
   operating said first intake valve and adjusting at least one of an opening timing and a closing timing of said first intake valve to adjust engine output while intermittently operating said second intake valve to maintain said higher temperature of said second air stream.

2. The method of claim 1, wherein during a spark ignition combustion mode said second intake valve is operated intermittently with respect to the operation of said first intake valve, where said first valve operates more frequently than said second valve.

3. The method of claim 1, wherein said first air stream provided to the cylinder by said first intake valve is substantially greater than said second air stream provided to the cylinder by said second intake valve.

4. The method of claim 1, wherein said second air stream is at least partially heated by a heat exchanger disposed upstream of the cylinder, and wherein the method further comprises varying said intermittent operation of said second valve as an amount of heat provided to the second air stream by the heat exchanger varies.

5. The method of claim 4, wherein said intermittent operation is varied to increase the amount of the second air stream provided to the cylinder as the amount of heat provided to the second air stream by the heat exchanger decreases.

6. The method of claim 4, wherein said intermittent operation is varied to decrease the amount of the second air stream provided to the cylinder as the amount of heating provided to the second air stream by the heat exchanger increases.

7. The method of claim 1, wherein said second air stream is at least partially heated by a heat exchanger disposed upstream of the cylinder, and wherein the method further comprises varying an amount of heat provided to the second air stream by the heat exchanger in response to said intermittent operation of said second intake valve.

8. The method of claim 1, wherein said intermittently operating said second intake valve includes varying the opening provided by said second intake valve via electric valve actuation to supply at least some flow of the second air stream to the cylinder.

9. The method of claim 1, wherein said cylinder is configured to selectively operate in a spark ignition mode and a compression ignition mode, and wherein said intermittent operation is varied to increase the amount of the second air stream provided to the cylinder for a plurality of instances prior to a transition from the spark ignition operation to the compression ignition operation.

10. The method of claim 1, further comprising operating said first intake valve and adjusting at least one of an opening timing and a closing timing of said first intake valve in response to said intermittent operation of the second intake valve.

11. The method of claim 10, wherein the amount of the first air stream provided to the cylinder is decreased in proportion to an increase in the amount of the second air stream provided to the cylinder by the intermittent operation of the second intake valve.

12. The method of claim 1 further comprising, wherein during a compression ignition combustion with the cylinder, operating the first intake valve and the second intake valve to control the timing of autoignition.

13. A method of operating an engine having at least one cylinder, at least a first intake passage operatively coupled to the cylinder for directing intake air to the cylinder, and a heat exchanger arranged along the first intake passage for heating the intake air passing through the first intake passage before reaching the cylinder, the method comprising:

varying an amount of heat provided to the intake air by the heat exchanger in response to a combustion mode of the cylinder; and supplying heated intake air to the cylinder by intermittently operating a first intake valve, wherein said intermittent operation of the first intake valve is varied as the amount of heat provided to the intake air by the heat exchanger varies.

14. The method of claim 13, wherein the cylinder further includes a second intake passage bypassing the heat exchanger and operatively coupled to the cylinder for directing cooler intake air to the cylinder, the method further comprising, supplying the cooler intake air to the cylinder by operating a second intake valve in response to the intermittent operation of the first intake valve.

15. The method of claim 14, wherein the cooler intake valve is operated more frequently than the first intake valve.

16. The method of claim 15, wherein during a spark ignition operation, the second intake valve provides a greater amount of cooler intake air to the cylinder than the heated intake air provided by the first intake valve.

17. The method of claim 13, wherein the amount of heat provided to the intake air by the heat exchanger is further varied in response to gradual heating or cooling of the cylinder walls.

18. A method of operating an engine having at least a first and a second cylinder, wherein the second cylinder is configured to selectively operate in at least two operating modes including a first mode and a second mode, the method comprising:

directing a first air stream to an intake valve of the first cylinder;

directing a second, separate air stream to a second intake valve of the first cylinder, said second air stream at a higher temperature than said first air stream;

operating said first intake valve and adjusting at least one of an opening timing and a closing timing of said first intake valve to adjust engine output; and varying an operation of said second intake valve in response to the operating mode of the second cylinder, wherein a greater ratio of the second air stream to the first air stream is provided to the first cylinder during the first mode than during the second mode.

19. The method of claim 18, wherein the first mode includes an activated state of the second cylinder and the second mode includes a deactivated state of the second cylinder.

20. The method of claim 18, wherein the first mode includes spark ignition combustion performed by the second cylinder and the second mode includes controlled auto-ignition combustion performed by the second cylinder.

21. A method of operating an engine having at least one cylinder including a first intake passage for directing air of a first temperature to the cylinder via a first intake valve and a second separate intake passage for directing air of a second temperature to the cylinder via a second intake valve, wherein said first temperature is greater than said second temperature, the method comprising:

during a first cycle, operating said first intake valve with a longer lift duration than said second intake valve and injecting a first amount of fuel into the cylinder; and during a subsequent second cycle, operating said second intake valve with a longer lift duration than said first intake valve and injecting a second amount of fuel into the cylinder, wherein said second amount of fuel is based on least a timing of the first intake valve closing and a timing of the second intake valve closing.

22. The method of claim 18, where varying the operation of said second intake valve in response to the operating mode of the second cylinder further includes intermittently varying the operation of said second intake valve in response to the operating mode of the second cylinder to maintain the second air stream at the higher temperature.

* * * * *